United States Patent [19]

Stephens et al.

[11] Patent Number: 5,380,705

[45] Date of Patent: Jan. 10, 1995

[54] DRILLING MUD COMPRISING TETRAPOLYMER CONSISTING OF N-VINYL-2-PYRROLIDONE, ACRYLAMIDOPROPANESULFONIC ACID, ACRYLAMIDE, AND ACRYLIC ACID

[75] Inventors: Michael Stephens, Bartlesville; Billy L. Swanson, Delaware; Bharat B. Patel, Bartlesville, all of Okla.

[73] Assignee: Phillips Petroleum Company, Bartlesville, Okla.

[21] Appl. No.: 237,942

[22] Filed: May 2, 1994

Related U.S. Application Data

[63] Continuation of Ser. No. 924,815, Aug. 4, 1992, abandoned, which is a continuation-in-part of Ser. No. 469,997, Jan. 25, 1990, Pat. No. 5,135,909.

[51] Int. Cl.$^6$ .............................................. C09K 7/02
[52] U.S. Cl. .................................................. 507/121
[58] Field of Search ........................................ 507/121

[56] References Cited

U.S. PATENT DOCUMENTS

| | | | |
|---|---|---|---|
| 4,048,077 | 9/1977 | Englehardt et al. | 252/8.5 C |
| 4,076,628 | 2/1978 | Clampitt | 252/8.5 C |
| 4,293,427 | 10/1981 | Lucas et al. | 252/85 |
| 4,358,355 | 11/1982 | Kalu et al. | 204/159.16 |
| 4,432,881 | 2/1984 | Evani | 252/8.5 A |
| 4,455,240 | 6/1984 | Costello | 252/85 |
| 4,471,097 | 9/1984 | Uhl et al. | 526/240 |
| 4,525,562 | 6/1985 | Patel | 526/271 |
| 4,547,299 | 10/1985 | Lucas | 252/85 |
| 4,599,390 | 7/1986 | Fan et al. | 526/240 |
| 4,622,373 | 11/1986 | Bardoliwalla | 526/240 |
| 4,626,362 | 12/1986 | Dickert, Jr. et al. | 252/8.51 |
| 4,631,137 | 12/1986 | Dymond | 252/8.514 |
| 4,652,623 | 3/1987 | Chen et al. | 526/287 |
| 4,655,942 | 4/1987 | Dickert, Jr. et al. | 252/85 |
| 4,675,119 | 6/1987 | Farrar et al. | 252/8.514 |
| 4,699,225 | 10/1987 | Bardoliwalla | 175/72 |
| 4,726,906 | 2/1988 | Chen et al. | 252/8.514 |
| 4,741,843 | 5/1988 | Garvey et al. | 252/85 |
| 4,951,921 | 8/1990 | Stahl et al. | 252/8.551 |
| 5,025,040 | 6/1991 | Crema et al. | 523/130 |
| 5,028,341 | 7/1991 | Liao | 252/8.512 |
| 5,135,909 | 8/1992 | Stephens et al. | 507/121 |

FOREIGN PATENT DOCUMENTS 2054518 5/1992 Canada .
473920 3/1992 European Pat. Off. .

OTHER PUBLICATIONS

Development and Evaluation of EOR Polymers Suitable for Hostile Environments–Part 1: Copolymers of Vinylpyrrolidone and Acrylamide, SPE Reservoir Engineering, No. 1987, pp. 461–467.

High Temperature and Hardness Stable Copolymers of Vinylpyrrolidone and Acrylamide, Water–Soluble Polymers for Petroleum Recovery, 1988, pp. 121–130.

Associating Polymers with Hydrophobic and Zwitterionic Groups, D. Schulz et al, Polymer Preprints ACS, 1991, pp. 571–572.

"Composition and Properties of Drilling and Completion Fluids" Fifth Edition, H. C. H. Darley & George R. Gray, pp. 166–175.

"Aldrich" Cover pg. and p. 393.

*Primary Examiner*—Gary Geist
*Attorney, Agent, or Firm*—G. L. Haag

[57] ABSTRACT

A water-based drilling fluid comprising a water soluble tetrapolymer in combination with clayey materials.

18 Claims, No Drawings

DRILLING MUD COMPRISING TETRAPOLYMER CONSISTING OF N-VINYL-2-PYRROLIDONE, ACRYLAMIDOPROPANESULFONIC ACID, ACRYLAMIDE, AND ACRYLIC ACID

This application is a continuation of application Ser. No. 07/924,815 filed Aug. 4, 1992, now abandoned, which is a continuation-in-part of application Ser. No. 07/469,997 filed Jan. 25, 1990, now Pat. No. 5,135,909.

FIELD OF THE INVENTION

This invention relates to water-based drilling fluids, In another aspect, this invention relates to controlling the rheological properties of water-based drilling fluids. In another aspect, this invention relates to a method of drilling a well utilizing water-based drilling fluids exhibiting improved water loss control. In accordance with a further aspect, this invention relates to an additive package comprising tetrapolymers to significantly reduce water loss in drilling fluids.

BACKGROUND OF THE INVENTION

In the drilling of wells by the rotary method, a drilling fluid is used which generally consists of an aqueous clay suspension often containing weighting agents to increase the hydrostatic head and frequently also containing concentrated collodial suspending and conditioning agents.

The drilling fluid serves to bring cuttings to the surface, to cool the bit and to keep the oil, gas and water confined to their respective formations during the drilling process. For these functions, it is necessary that the drilling fluid be a pumpable viscosity, have sufficient carrying capacity to bring cuttings to the surface, and yet be fluid enough to release cuttings and entrained gas at the surface.

A highly important property of drilling muds is the ability to form an impervious filter cake upon the permeable walls of the bore hole, thus inhibiting further ingress of water from the drilling fluid into the formation. Excessive fluid loss from drilling fluids can cause severe problems. For example, filter cake build-up can become so thick that the drill pipe may become stuck. Also, there may be great difficulty in withdrawing pipe from the hole. Also, high water losses can cause sloughing and caving in of shale formations. In addition, electrical logging of the well can be adversely influenced due to the mud filtrates, etc.

Various water loss control agents have been previously proposed to improve the properties of drilling fluids, but not all of these have been successful.

Applicants have discovered tetrapolymers which have attractive properties as fluid loss control agents.

Accordingly, an object of this invention is to provide an improved drilling fluid.

Another object of this invention is to provide an improved method of drilling a well.

Another object of the invention is to control the rheological properties of drilling fluids.

Other objects, aspects, as well as the several advantages of the invention will be apparent to those skilled in the art upon reading the following disclosure and appended claims.

SUMMARY OF THE INVENTION

In accordance with the present invention we have discovered a water-based drilling fluid comprising a) a clayey mineral in an amount effective in a water-based drilling fluid; and
b) a tetrapolymer provided in an amount effective to provide fluid loss control.

In accordance with a further embodiment of the present invention we have also discovered a method for drilling a well utilizing a rotary drill comprising circulating through said well a water-based drilling fluid containing an effective amount of a clayey material for a water-based drilling fluid and an effective amount of tetrapolymer to control water-loss wherein said water-based drilling fluid will form a filter cake on the wall of said well.

DETAILED DESCRIPTION

As used in this application the term tetrapolymer refers to the polymerization product of at least a four monomer component polymerization. The four monomer components suitable for the practice of the present invention are:

Monomer component A which has the formula

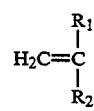

wherein $R_1$ is selected from the group consisting of hydrogen and methyl radicals, and $R_2$ is selected from the group consisting of sulfo, sulfophenyl, sulfoalkyl, sulfoalkyl amido, and alkali salts thereof; wherein the $R_2$ alkylene and alkyl radicals contain from 1 to 4 carbon atoms and the alkali salt is a salt of a cation selected from the group consisting of sodium, potassium, and ammonium;

Monomer component B which has the formula

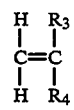

wherein $R_3$ is selected from the group consisting of hydrogen, methyl, and ethyl radicals, and $R_4$ is selected from the group consisting of N-alkyl substituted amide, N,N-dialkyl substituted amide, carboxyl alkylene amine, carboxyl alkylene methyl amine, carboxyl alkylene dimethyl amine, pyrrolidonyl, formamido and acetamido radicals, wherein the alkyl radical of said N-alkyl substituted amide is selected from the group consisting of methyl, ethyl, and propyl radicals; wherein the $R_4$ alkylene radical contains 1 to 3 carbon atoms; wherein the alkyl radical of said N,N-dialkyl substituted amide is selected from the group consisting of methyl or ethyl radicals.

Monomer component C which has the formula

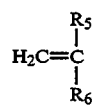

wherein $R_5$ is selected from the group consisting of hydrogen and methyl, and $R_6$ is selected from the group consisting of amide, nitrile, acetyl and pyridinyl radicals;

Monomer component D, which has the formula

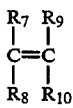

wherein $R_7$ is selected from the group consisting of hydrogen, hydroxyl and methyl radicals; $R_8$ is selected from the group consisting of hydrogen, hydroxyl, methyl and carboxyl radicals; $R_9$ is selected from the group consisting of chlorine, bromine, hydrogen, methyl and carboxyl radicals or where $R_8$ can be linked to $R_{10}$ by an anhydride group; or $R_{10}$ is selected from the group consisting of carboxyl, and alkyl carboxyl radicals; wherein the alkyl radical of said alkyl carboxyl radical contains 1 to 8 carbon atoms and alkali salts thereof; wherein said alkali salt is a salt of a cation selected from the group consisting of sodium, potassium, and ammonium.

Suitable examples of monomer component A include but are not limited to compounds selected from the group consisting of 2-acrylamido-2-methylpropanesulfonic acid, alkali salts of 2-acrylamido-2-methylpropane sulfonic acid, vinyl sulfonic acid, alkali salts of vinyl sulfonic acid, vinyl benzene sulfonic acid, alkali salts of vinyl benzene sulfonic acid, allyl sulfonic acid, alkali salts of allyl sulfonic acid, methallyl sulfonic acid, alkali salts of methallyl sulfonic acid, 3-methacrylamido-2-hydroxypropyl sulfonic acid, alkali salts of 3-methacrylamido-2-hydroxypropyl sulfonic acid and combinations of two or more thereof; wherein said alkali salts are salts of a cation selected from the group consisting of sodium, potassium, and ammonium.

Suitable examples of monomer component B include but are not limited to compounds selected from the group consisting of N,N-dimethylacrylamide, N-vinyl-2-pyrrolidone, N-vinylacetamide, dimethylamino ethyl methacrylate, N-methyl(meth) acrylamide, N-ethyl (meth) acrylamide, N-propyl (meth) acrylamide, N-vinyl formamide, and combinations of two or more thereof.

Suitable examples of monomer component C include but are not limited to monomers selected from the group consisting of acrylamide, methacrylamide, acrylonitrile, methacrylonitrile, vinylacetate, vinylpyridine and combinations of any two or more thereof.

Suitable examples of monomer component D include but are not limited to compounds selected from the group consisting of acrylic acid, alkali salts of acrylic acid, methacrylic acid, alkali salts of methacrylic acid, itaconic acid, alkali salts of itaconic acid, aconitic acid, alkali salts of acontic acid, undecylenic acid, alkali salts of undecylenic acid, angelic acid, alkali salts of angelic acid, maleic anhydride, maleic acid, alkali salts of maleic acid, chloroacrylic acid, alkali salts of chloroacrylic acid, citraconic acid, alkali salts of citraconic acid and combinations of any two or more thereof, where said alkali salt is a salt of a cation selected from the group consisting of sodium, potassium and ammonium.

As used in this application, the term tetrapolymer broadly refers to a water soluble polymer which is composed of a) from about 1 to about 60 weight percent of monomer component B; b) from about 1 to about 60 weight percent of monomer component C; c) from about 10 to about 90 weight percent of monomer component A; and d) from about 1 to about 60 weight percent of monomer component D.

One preferred tetrapolymer contains from about 30 to about 40 weight percent of N-vinyl-2-pyrrolidone, from about 5 to about 15 weight percent of acrylamide, from about 50 to about 60 weight percent of sodium 2-acrylamido-2-methylpropane sulfonate, and from about 1 to about 10 weight percent of acrylic acid.

Currently the preferred tetrapolymer composition comprises a) from about 10 to about 61 weight percent of monomer component A; b) from about 10 to about 60 weight percent of monomer component B; c) from about 3 to about 60 weight percent of monomer component C; and d) from at least 10 to about 55 weight percent of monomer component D.

The currently most preferred tetrapolymer composition comprises a) from about 15 to about 45 weight percent of monomer component A; b) from about 10 to about 30 weight percent of monomer component B; c) from about 20 to about 45 weight percent of monomer component C; and d) from about 10 to about 20 weight percent of monomer component D. This particular tetrapolymer composition is believed to provide the best water loss control of any water loss control polymer tested to date. Tetrapolymers of this composition show extremely good water loss control over a broad range of temperatures in fresh water and brine solutions. The preferred monomer components for making this tetrapolymer composition are a) 2-acrylamido-2-methylpropane sulfonic acid, or sodium 2-acrylamido-2-methylpropane sulfonate; b) N-vinyl-2-pyrrolidone; c) acrylamide; and d) sodium acrylate or acrylic acid.

When sea water or a near equivalent is used in major portion (i.e., greater than 50 vol. %) or is the sole water source used to meet the water requirements in preparing the drilling fluid, the preferred tetrapolymer composition comprises a) about 60 to about 80 weight percent of a monomer component A; b) about 5 to about 20 weight percent of monomer component B; c) about 5 to about 15 weight percent of monomer component C; and d) about 5 to about 10 weight percent of monomer component D. The most preferred tetrapolymer composition when sea water or a near equivalent is used in major portion or as the sole water source in drilling fluid make-up comprises a) about 70 weight percent of monomer component A; b) about 10 to about 20 weight percent of monomer component B; c) about 5 to about 15 weight percent of monomer component and d) about 5 to about 10 weight percent of monomer component D. The preferred monomer components for this tetrapolymer composition are a) 2-acrylamido-2-methylpropane sulfonic acid or sodium 2-acrylamido-2-methylpropane sulfonate for component A; b) N-vinyl-2-pyrrolidone for component B; c) acrylamide for component C; and d) sodium acrylate or acrylic acid for component B.

The water-based drilling fluid preferably comprises a clayey material and water in amount effective to form a water-base drilling fluid, and a tetrapolymer as described in the preceding paragraph in an amount effective for water-loss control. Acceptable water sources include but are not limited to fresh water, salt water, sea water, brackish water, and hard brine. When see water is selected, comparative studies indicate the preceding tetrapolymer formulations when added to a drilling fluid provide outstanding drilling fluid performance characteristics when compared to alternative drilling fluid additives. The cited tetrapolymers also demonstrate acceptable performance when other water sources are used.

The tetrapolymers of the present invention can be prepared by polymerization in accordance with any of the well known free radical techniques in solution, suspension or emulsion environment. See, for example U.S. Pat. No. 3,547,899, or European patent application No. 0115836. In addition, other methods of polymerization known to one skilled in the art may be employed.

Preferred for the practice of the present invention is the polymerization of the four monomer components in a highly energetic polymerization process wherein a significant excess of initiation energy is provided by chemical or electromagnetic means including electrons, gamma rays, x-rays, slow neutrons and ultra violet radiation. The utilization of excess initiation energy appears to result in the formation of consistently better tetrapolymers for use in water loss control. By way of guidance but in no way limited to the present invention it has been found that a 100 percent excess of a chemical initiator such as 2,2'-azobis-(N,N'-dimethylene isobutyramidine) dihydrochloride is effective to produce tetrapolymers with improved water loss control.

The molecular weight of the tetrapolymers of the present invention may be varied over a considerable range. The molecular weight may be as low as 30,000 or as high as 1,000,000 or more.

In water-based drilling mud composition, the combined amount of tetrapolymer present in the mud can vary appreciably but will be an amount which is sufficient to reduce water loss due to filtration through a filter cake in a well—in other words, a water loss reducing amount. Generally, the total tetrapolymer comprises in the range of about 0.25 to 8.0 lb/bbl based on barrels of mud composition, preferably in the range of about 0.5 to about 5.0 lbs. per barrel of mud wherein approximately 6 to about 16 lb/bbl of clayey mineral (such as clayey minerals selected from the group consisting of bentonite, attapulgite, sepiolite and hectorite) are provided in each 42 gallon barrel.

In actual operation, the tetrapolymer can be blended together with other additives for incorporation into a drilling fluid. In the event that other additives are used, the tetrapolymer can be added together with the additive or separately to a drilling fluid. It is also within the scope of the invention to add the tetrapolymer to a drilling fluid followed by addition of a mixture of other additives.

The tetrapolymer of the instant invention is suitable for use in fresh water, salt water, sea water, brackish water, and hard brine environments.

As used herein, the term "sea water" is intended to refer to any water obtained from the open seas and oceans of the world. The term "brine" as used herein is intended to include any aqueous solution of mineral salts having greater than 10,000 ppm dissolved solids content, such as are frequently present in oil fields. Oil field brines commonly contain varying amounts of sodium chloride, calcium chloride, or magnesium salts.

The drilling compositions of the invention preferably comprise an aqueous composition containing an effective amount of a clayey material, and optionally weighting, suspending and conditioning agents. Additives such as oxidation and corrosion inhibitors, bactericides, thinners, etc., can be added to the aqueous solution.

In utilizing the drilling fluid of the invention, a well is drilled by rotating a hollow drill stem having a drill bit attached thereto to form a bore hole and the drilling fluid is circulated down through the drill stem and out the bit and then upwardly to deposit a filter cake on the walls of the bore hole and carry cuttings to the surface.

The following examples will serve to further illustrate the invention.

Example I

All polymers were prepared using a bulk solution polymerization, with a free radical initiator in a stoichiometric excess (approximately 100% excess). The initiator used was 2,2'-azobis-(N,N'-dimethyleneisobutyramidine) dihydrochloride. The monomer components were added in the desired weight percent ratio, with water being added to achieve the desired solids content. EDTA (tetrasodium ethylenediamine tetraacetate), a chelating agent, was also added in a stoichiometric excess. The system was thoroughly purged with an inert gas, and the monomers were allowed to react at temperatures in the range of 20° to 60° C. The following tetrapolymers were made utilizing this procedure.

TABLE I

| Polymer Sample No. | Monomer Ratio, weight % | | | |
|---|---|---|---|---|
| | AM | NaAc | SAMPS | NVP |
| 227-52-1 | 10 | 16.65 | 54.9 | 18.45 |
| 227-53-1 | 9 | 9.5 | 61 | 20.5 |
| 227-69-4 | 3 | 15.5 | 61 | 20.5 |
| 237-26-1 | 3 | 15.5 | 61 | 20.5 |

AM = acrylamide
NaAc = sodium acrylate
SAMPS = sodium 2-acrylamido-2-methylpropane sulfonate
NVP = N-vinylpyrrolidone

Example II

This example demonstrates the effectiveness of various polymers in the prevention of water loss in drilling mud. The specific mud used here was Baroid hard brine mud. Polymers were added as specific to Baroid hard brine mud, along with enough tap water to make a total volume of 350 mls. The resulting solution was stirred for 20 minutes on a Multi-Mixer, and then tested according to American Petroleum Institute (API) procedure RP-13 B. Test Results are shown in Table II.

TABLE II

| Tetrapolymers Added to Baroid Hard Brine Mud | | | | | | |
|---|---|---|---|---|---|---|
| Polymer | ppb | Type | PV | YP | Gels | RTWL |
| Base Mud | — | — | | | | |
| 227-51-2 | 2.25 | 35% gel long | 7 | 0 | 4/— | 15.8 |
| 227-53-1 | 2.25 | 35% gel long | 8 | — | 2/— | 11.7 |

Baroid Hard Brine = 1235 g NaCl, 308 g CaCl$_2$, and 78.5 g MgCl$_2$ to Total volume 5000 mls tap water.
Baroid Hard Brine Mud = 240 ml Baroid Hard Brine, 9.8 g attapulgite clay, stir 20 minutes.
ppb represent pounds per barrel.
PV represent plastic viscosity in centipoise.
YP represent yield point in lb/100 ft$^2$.
Gels represents gel strength in lb/100 ft$^2$, 10 sec. and 10 min.
RTWL represents room temperature water loss of 100 psi in ml/30 min.

Example III

This example demonstrates the effectiveness of various polymers in the control of water loss in drilling mud. The specific mud used here was saturated NaCl water mud. Polymers were added as specified to NaCl water mud, along with enough tap water to make a total volume of 350 mls. The resulting solution was stirred for 20 minutes on a Multi-Mixer, aged for 16 hours at 350° F., and then tested according to American Petroleum Institute (API) procedure RP-13 B. Test results are shown in Table III.

TABLE III

| Tetrapolymers Added to Saturated NaCl Water Mud (After Aging 16 Hours at 350° F.) | | | | | | | |
|---|---|---|---|---|---|---|---|
| Polymer | ppb | Type | PV | VP | Gels | RTWL | HTHPWL |
| Base Mud | — | — | | | | | |
| 237-26-1 | 11 | 35% gel log | 52 | 15 | 4/6 | 2.0 | 12.0 |
| 227-69-4 | 3.85 | dry | 43 | 1 | 8/14 | 4.8 | 26.0 |
| Hostadrill ® | 5.0 | dry | 45 | 0 | 1/3 | 6.0 | 48.0 |

Saturated NaCl water mud = 215 ml tap water, 3 g bentonite, 76 g NaCl, 10 g causticized lignite, 0.8 g NaOH, and 350 g barite.
Hostadrill ® is a commercially available drilling fluid additive from Hoescht.
ppb represent pounds per barrel.
PV represent plastic viscosity in centipoise.
YP represent yield point in lb/100 ft$^2$.
Gels represents gel strength in lb/100 ft$^2$, 10 sec. and 10 min.
TRWL represents room temperature water loss at 100 psi in ml/30 min.
HTHPWL represents water loss at 350° F., 500 psi in ml/30 min.

Example IV

This example demonstrates the effectiveness of various polymers in the control of water loss in drilling fluid. The specific fluid used here was fresh water mud, Polymers were added as specific to fresh water mud, along with enough tap water to make a total volume of 350 mls. The resulting solution was stirred for 20 minutes on a Multi-Mixer aged for 16 hours at 350° F. and then tested according to American Petroleum Institute (API) procedure RP-13 B. Test results are shown in Table IV.

TABLE IV

| Tetrapolymers Added to Fresh Water Mud | | | | | | | |
|---|---|---|---|---|---|---|---|
| Polymer | ppb | Type | PV | VP | Gels | RTWL | HTHPWL |
| Base Mud | — | — | 7 | 4 | 1/3 | 18.0 | — |
| 237-26-1 | 2.3 | 35% gel log | 17 | 16 | 4/5 | 8.0 | — |

Fresh Water Mud = 350 g tap water and 10 g bentonite
ppb represent pounds per barrel.
PV represent plastic viscosity in centipoise.
YP represent yield point in lb/100 ft$^2$.
Gels represents gel strength in lb/100 ft$^2$, 10 sec. and 10 min.
RTWL represents room temperature water loss at 100 psi in ml/30 min.
HTHPWL represents water loss at 350° F., 500 psi in ml/30 min.

Example V

This example demonstrates the effectiveness of various polymers in the control of water loss in fresh, salt water and sea water drilling muds. The tetrapolymers were prepared from the designated monomers in the designated weight percentages using the procedure of Example I.

Tests in fresh water mud were conducted using a base mud mixture prepared by mixing a 12.2 lb/gal mud and 2500 mL tap water in a Disperator. The 12.2 lb/gal mud was prepared by mixing 47 g bentonite, 235 g illite clay and 560 g barite per 1000 mL tap water. The mud had been stored at room temperature for more than 6 months. The test samples containing tetrapolymer were prepared by combining 375 g of base mud with 25 g of an aqueous 4 wt. % tetrapolymer solution or 360 g of base mud with 37.5 g of an aqueous 4 wt. % tetrapolymer solution. The mixture was then stirred for 20 min. on a Multi-Mixer.

Test samples for tests in salt water mud were prepared by combining 100 mL tap water, 70 g NaCl, 400 g barite, 20 g OCMA clay (API designation) and 125 g of aqueous 4 wt. % tetrapolymer solution. The mixture was pH adjusted using 50 wt/vol. % NaOH to a pH of 8.5 and thoroughly mixed for 20 min. using a Multi-Mixer.

Tests in sea water mud were conducted using a base mud prepared by mixing in a Disperator 2500 mL tap water and 75 g bentonite for 20 min. and then pH adjusting using 50 wt/vol. % NaOH to a pH of 10.5. CF Desco (Drilling Specialties, Bartlesville, Okla.) was then added to the Disperator in the amount of 2.5 g and mixed. This addition was followed by the addition and mixing of 250 g sea salt (Lake Products Co., St. Louis, Mo.) and then 125 g lignite. The base mud was then pH adjusted with 50 wt/vol. % NaOH to a pH of 9.0 where is was maintained. The actual test specimens were prepared by continuously mixing in the Multi-Mixer 30 g of base mud and 120 g of aqueous 4 wt. % tetrapolymer solution for 20 min. and then adding 420 g barite and thoroughly mixing for 5 min. This addition was followed by the addition of 25 g Rev Dust drilling solids (Milwhite Company, Houston, Tex.) and thorough mixing in the Multi-Mixer for 10 min.

The drilling fluids were tested initially and after 16 hrs. aging using the American Petroleum Institute (API) procedure RP-13 B (1991) for the measurement of average viscosity, plastic viscosity, yield point, gel strength, and API water loss. The test procedure after 16 hrs. aging was to cool the drilling fluid to room temperature, stir in a Multi-mixer for 5 min. and then conduct the necessary tests. Test results are presented in Tables V-VII.

TABLE V

| | Tests in Fresh Water Mud | | | | | | | | |
|---|---|---|---|---|---|---|---|---|---|
| | Monomers, Wt. % | | | | | | | Water Loss | |
| Prep # (g) | AMP | AM | AC | NVP | AV | PV/YP | Gels | RT | HT |
| | Initial Results | | | | | | | | |
| Base Mud | — | — | — | — | 5.0 | 5/0 | 1/1 | 19.6 | — |
| 12$^a$ | 40 | 25 | 15 | 20 | 11.5 | 11/1 | 1/2 | 6.8 | — |
| 13$^a$ | 70 | 10 | 10 | 10 | 16.0 | 14/4 | 1/2 | 6.8 | — |
| 12$^b$ | 40 | 25 | 15 | 20 | 15.5 | 14/3 | 1/2 | 6.2 | — |
| 13$^b$ | 70 | 10 | 10 | 10 | 22.0 | 17/10 | 2/2 | 6.4 | — |
| | After Hot-Rolling 16 Hours at 350° F. | | | | | | | | |

TABLE V-continued

| | | Tests in Fresh Water Mud | | | | | | | |
|---|---|---|---|---|---|---|---|---|---|
| | | Monomers, Wt. % | | | | | | Water Loss | |
| Prep # (g) | AMP | AM | AC | NVP | AV | PV/YP | Gels | RT | HT |
| Base Mud | — | — | — | — | 7.0 | 7/0 | 1/2 | 25.2 | 88 |
| 12[a] | 40 | 25 | 15 | 20 | 13.0 | 11/4 | 1/2 | 7.4 | 41 |
| 13[a] | 70 | 10 | 10 | 10 | 15.5 | 15/1 | 1/1 | 7.8 | 40 |
| 12[b] | 40 | 25 | 15 | 20 | 17.5 | 16/3 | 1/2 | 5.8 | 32 |
| 13[b] | 70 | 10 | 10 | 10 | 17.5 | 16/3 | 2/2 | 5.6 | 33 |

[a] 0.25 wt % tetrapolymer.
[b] 0.38 wt % tetraplymer.
AMP represents sodium 2-acrylamido-2-methylpropane sulfonate.
AM represents acrylamide.
AC represents sodium acrylate.
NVP represents N-vinyl-2-pyrrolidone.
AV represents actual viscosity (API) in centipoise, (i.e., viscosity at 600 rpm divided by 2).
PV represents plastic viscosity in centipoise.
YP represents yield point in lb/100 ft$^2$.
Gels represents gel strength in lb/100 ft$^2$ at 10 sec. and 10 min.
RT represents API measured water loss at room temperature at 100 psi in ml/30 min.
HT represent API measured water loss at 350° F. at 100 psi in ml/30 min.

TABLE VI

| | | Tests in Salt Water Mud | | | | | | | |
|---|---|---|---|---|---|---|---|---|---|
| | | Monomers, Wt. % | | | | | | Water Loss | |
| Prep # (g) | AMP | AM | AC | NVP | AV | PV/YP | Gels | RT | HT |
| | | | Initial Results | | | | | | |
| 12 | 40 | 25 | 15 | 20 | 80.5 | 65/31 | 2/3 | — | — |
| 14 | 70 | 10 | 5 | 15 | 70.5 | 57/27 | 2/5 | — | — |
| 16 | 70 | 15 | 5 | 10 | 73.0 | 60/24 | 2/3 | — | — |
| | | After Static Aging 16 Hours at 350° F. | | | | | | | |
| 12 | 40 | 25 | 15 | 20 | 39.5 | 38/3 | 1/1 | 0.8 | 11 |
| 14 | 70 | 10 | 5 | 15 | 57.5 | 52/11 | 2/2 | 1.1 | 11 |
| 16 | 70 | 15 | 5 | 10 | 48.0 | 46/4 | 1/1 | 1.0 | 14 |

For other nomenclature, see Table V.

TABLE VII

| | | Tests in Sea Water Mud | | | | | | | |
|---|---|---|---|---|---|---|---|---|---|
| | | Monomers, Wt. % | | | | | | Water Loss | |
| Prep # (g) | AMP | AM | AC | NVP | AV | PV/YP | Gels | RT | HT |
| | | | Initial Results | | | | | | |
| 10 | 40 | 10 | 30 | 20 | 127.5 | 107/41 | 4/12 | 2.8 | — |
| 11 | 40 | 25 | 15 | 20 | 82.5 | 69/27 | 5/13 | 3.8 | — |
| 12 | 40 | 25 | 15 | 20 | 75.0 | 66/18 | 3/11 | 3.3 | — |
| 13 | 70 | 10 | 10 | 10 | 134.5 | 108/53 | 11/22 | 2.2 | — |
| 14 | 70 | 10 | 5 | 15 | 101.5 | 84/35 | 7/15 | 3.2 | — |
| 15 | 70 | 5 | 5 | 20 | 116.0 | 93/46 | 10/17 | 2.7 | — |
| 16 | 70 | 15 | 5 | 10 | 116.0 | 93/46 | 10/17 | 2.6 | — |
| | | After Static Aging 16 Hours at 350° F. | | | | | | | |
| 10 | 40 | 10 | 30 | 20 | 39.5 | 38/3 | 1/2 | 5.2 | NC |
| 11 | 40 | 25 | 15 | 20 | 36.0 | 36/0 | 1/2 | 9.1 | NC |
| 12 | 40 | 25 | 15 | 20 | 43.0 | 43/0 | 1/2 | 5.0 | NC |
| 13 | 70 | 10 | 10 | 10 | 77.5 | 68/19 | 3/13 | 7.0 | 37 |
| 14 | 70 | 10 | 5 | 15 | 73.5 | 65/17 | 2/4 | 3.6 | 30 |
| 15 | 70 | 5 | 5 | 20 | 98.5 | 83/31 | 3/8 | 3.4 | 26 |
| 16 | 70 | 15 | 5 | 10 | 51.5 | 47/9 | 2/2 | 5.9 | 44 |

CNM=Can not be measured by the API procedure.
NC=No Control (extremely high water loss).
Sea salt (ASTM-D-1141-52) purchased from Lake Products Co., St. Louis, Mo. Recipe for representative sea water is 41.93 g sea salt (dry basis) plus sufficient water to make 1 L.
Dry weight analysis of sea salt:

| | |
|---|---|
| NaCl | 58.49 wt % |
| MgCl$_2$.6H$_2$O | 26.46 |
| Na$_2$SO$_4$ | 9.75 |
| CaCl$_2$ | 2.765 |
| KCl | 1.645 |
| NaHCO$_3$ | 0.477 |
| KBr | 0.238 |
| H$_3$BO$_3$ | 0.0171 |
| SrCl$_2$.6H$_2$O | 0.095 |
| NaF | 0.007 |

For other nomenclature, see Table V.

What is claimed is:

1. A water-based drilling fluid comprising
   a) a clay and water in amount effective to form a water-based drilling fluid; and
   b) a tetrapolymer provided in an amount effective to provide water-loss control wherein the tetrapolymer is the product of a polymerization of the following four monomer components:

(i) 2-acrylamido-2-methylpropane sulfonic acid and alkali salts thereof present in an amount in the range of from about 10 weight percent to about 90 weight percent;
(ii) N-vinyl-2-pyrrolidone present in an amount in the range of from about 1 weight percent to about 60 weight percent;
(iii) acrylamide present in an amount in the range of from about 1 weight percent to about 60 weight percent; and
(iv) acrylic acid and alkali salts thereof present in an amount in the range of from about 1 to about 60 weight percent.

2. The water-based drilling fluid of claim 1 wherein said water is provided in a brine solution.

3. The composition of matter of claim 1 wherein the tetrapolymer is the product of a polymerization of the following four monomer components:
(i) 2-acrylamido-2-methylpropone sulfonic acid and alkali salts thereof present: in an amount in the range of about 60 weight percent to about 80 weight percent;
(ii) N-vinyl-2-pyrrolidone present in an amount in the range of about 5 weight percent to about 20 weight percent;
(iii) acrylamide present in an amount in the range of about 5 weight percent to about 15 weight percent; and
(iv) acrylic acid and alkali salts thereof present in an amount in the range of about 5 to about 10 weight percent.

4. The water-based drilling fluid of claim 3 wherein said water is provided by a brine solution.

5. The composition of matter of claim 3 wherein the tetrapolymer is present in the drilling fluid in the range of from about 0.25 to about 8 lbs/bbl and said clay is selected from the group consisting of bentonite, attapulgite, sepiolite and hectorite.

6. The composition of matter of claim 1 wherein the tetrapolymer is the product of a polymerization of the following four monomer components:
(i) 2-acrylamido-2-methylpropane sulfonic acid and alkali salts thereof present in an amount in the range of about 70 weight percent;
(ii) N-vinyl-2-pyrrolidone present in an amount in the range of about 10 weight percent to about 20 weight percent;
(iii) acrylamide present in an amount in the range of about 5 weight percent to about 15 weight percent; and
(iv) acrylic acid and alkali salts thereof present in an amount in the range of about 5 to about 10 weight percent.

7. The composition of matter of claim 6 wherein the tetrapolymer is present in the drilling fluid in the range of from about 0.25 to about 8 lbs/bbl and said clay is selected from the group consisting of bentonite, attapulgite, sepiolite and hectorite.

8. The composition of matter according to claim 6 wherein said water is provided in a brine solution.

9. The composition of matter of claim 1 wherein the tetrapolymer is present in the drilling fluid in the range of from about 0.25 to about 8 lbs/bbl and said clay is selected from the group consisting bentonite, attapulgite, sepiolite and hectorite.

10. A method for drilling a well utilizing a rotary drill comprising circulating through said well a water-based drilling fluid containing an effective amount of a clay and water to form a water-based drilling fluid and an effective amount of tetrapolymer to control water-loss wherein the tetrapolymer is the product of a polymerization of the following four monomer components.
(i) 2-acrylamido-2-methylpropane sulfonic acid and alkali salts thereof present in an amount in the range of from about 10 weight percent to about 90 weight percent;
(ii) N-vinyl-2-pyrrolidone present in an amount in the range of from about 1 weight percent to about 60 weight percent;
(iii) acrylamide present in an amount in the range of from about 1 weight percent to about 60 weight percent; and
(iv) acrylic acid and alkali salts thereof present in an amount in the range of from about 1 to about 60 weight percent and
said water-based drilling fluid will form a filter cake on the wall of said well.

11. The method of claim 10 wherein the tetrapolymer is the product of a polymerization of the following four monomer components:
(i) 2-acrylamido-2-methylpropane sulfonic acid and alkali salts thereof present in an amount in the range of about 70 weight percent;
(ii) N-vinyl-2-pyrrolidone present in an amount in the range of about 10 weight percent to about 20 weight percent;
(iii) acrylamide present in an amount in the range of about 5 weight percent to about 15 weight percent; and
(iv) acrylic acid and alkali salts thereof present in an amount in the range of about 5 to about 10 weight percent.

12. The method of claim 11 wherein said water is provided in a brine solution.

13. The method of claim 11 wherein the tetrapolymer is present in the drilling fluid in the range of from about 0.25 to about 8 lbs/bbl and said clay is selected from the group consisting of bentonite, attapulgite, sepiolite and hectorite.

14. The method of claim 10 wherein said water is provided in a brine solution.

15. The method of claim 10 wherein the tetrapolymer is the product of a polymerization of the following four monomer components:
(i) 2-acrylamido-2-methylpropane sulfonic acid and alkali salts thereof present in an amount in the range of about 60 weight percent to about 80 weight percent;
(ii) N-vinyl-2-pyrrolidone present in an amount in the range of about 5 weight percent to about 20 weight percent;
(iii) acrylamide present in an amount in the range of about 5 weight percent to about 15 weight percent; and
(iv) acrylic acid and alkali salts thereof present in an amount in the range of about 5 to about 10 weight percent and
said water-based drilling fluid will form a filter cake on the wall of said well.

16. The method of claim 15 wherein said water is provided in a brine solution.

17. The method of claim 15 wherein the tetrapolymer is present in the drilling fluid in the range of from about 0.25 to about 8 lbs/bbl and said clay is selected from the group consisting of bentonite, attanulgite, sepiolite and hectorite.

18. The method of claim 10 wherein the tetrapolymer is present in the drilling fluid in the range of from about 0.25 to about 8 lbs/bbl and said clay is selected from the group consisting of bentonite, attanulgite, sepiolite and hectorite.

* * * * *

UNITED STATES PATENT AND TRADEMARK OFFICE
CERTIFICATE OF CORRECTION

PATENT NO. : 5,380,705
DATED : January 10, 1995
INVENTOR(S) : Michael Stephens et al It is certified that error appears in the above-identified patent and that said Letters Patent is hereby corrected as shown below:

Claim 3, column 11, line 19, after "present", please delete ":"

Claim 17, column 12, line 62, please delete "attanulgite" and insert therefor --- attapulgite ---.

Claim 18, column 12, line 66, please delete "attanulgite" and insert therefor --- attapulgite ---.

Signed and Sealed this

Fifteenth Day of August, 1995

Attest:

BRUCE LEHMAN

Attesting Officer　　　Commissioner of Patents and Trademarks